Jan. 31, 1967  J. E. TURNEY  3,301,405
STORING GLASS SHEETS
Filed April 15, 1965  3 Sheets-Sheet 1
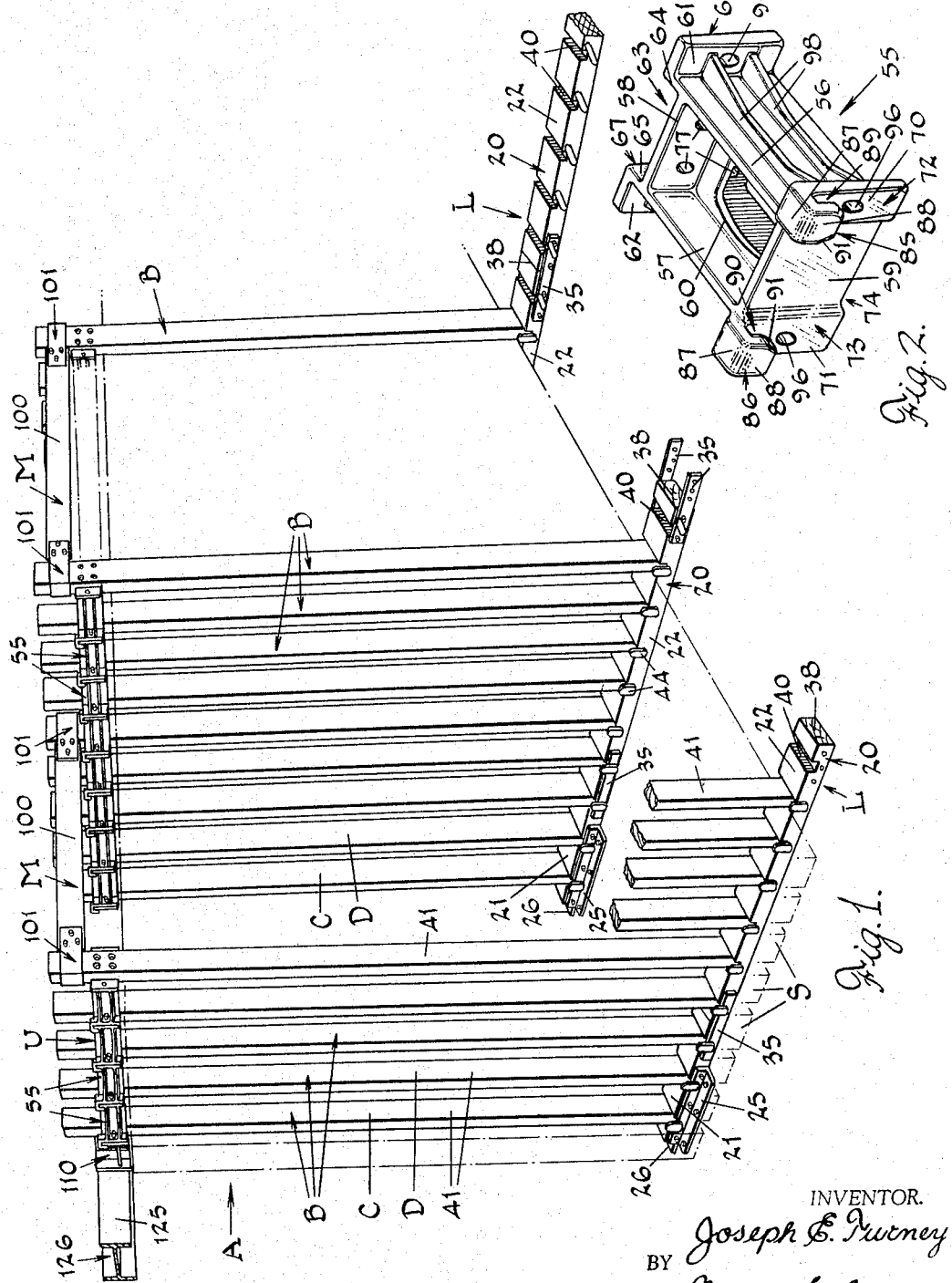
INVENTOR.
Joseph E. Turney
BY
Hobbe & Swope
ATTORNEYS Jan. 31, 1967 J. E. TURNEY 3,301,405
STORING GLASS SHEETS
Filed April 15, 1965 3 Sheets-Sheet 2
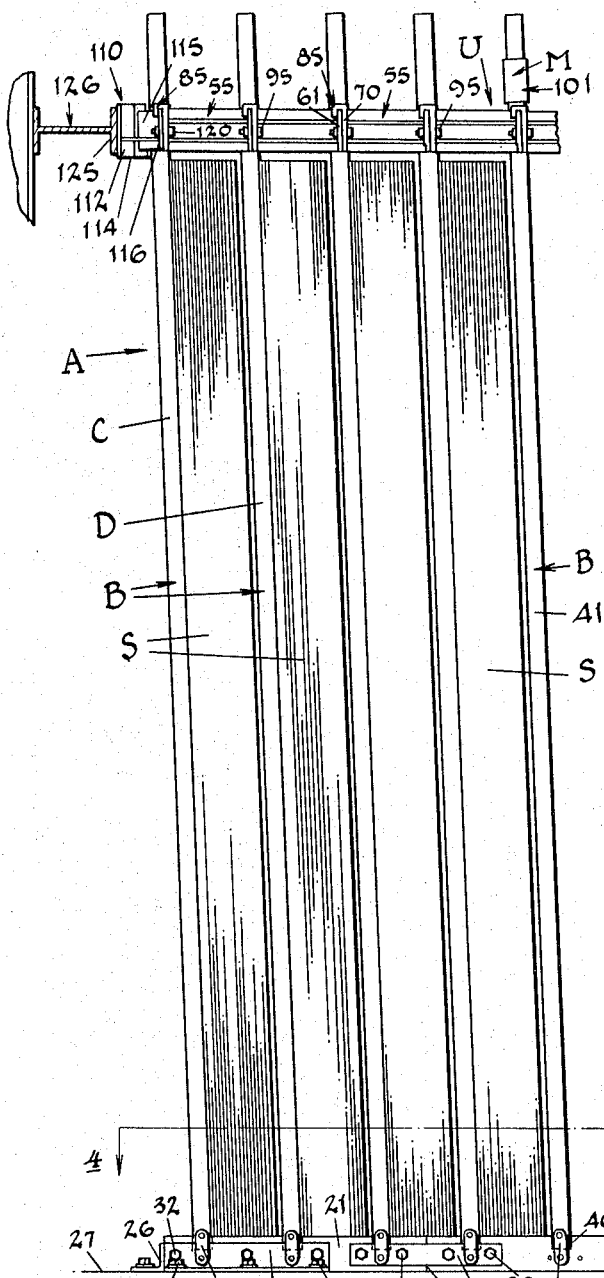
Fig. 3.
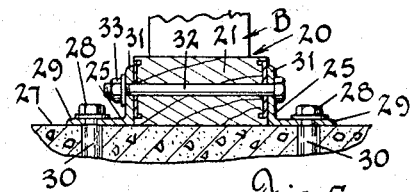
Fig. 5.
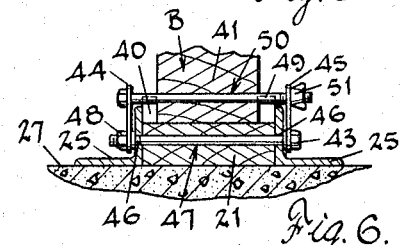
Fig. 6.
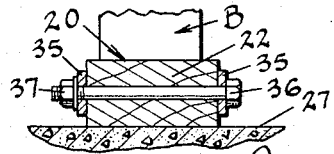
Fig. 7.
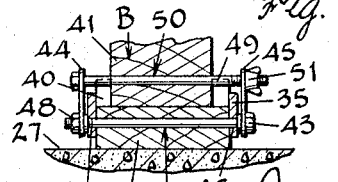
Fig. 8.
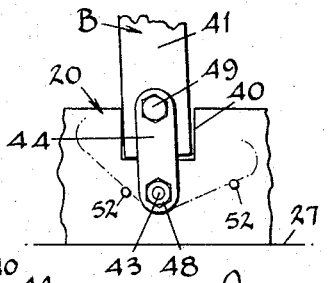
Fig. 9.
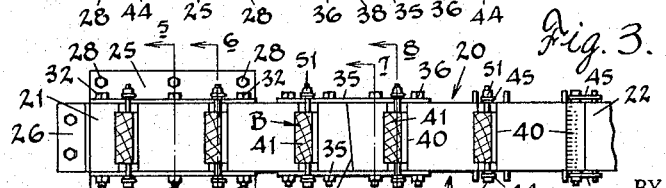
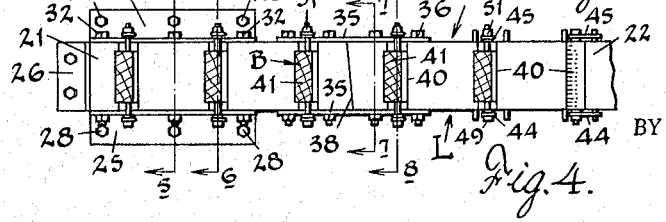
Fig. 4.
INVENTOR.
Joseph E. Turney
BY
Nobbe & Swope
ATTORNEYS Jan. 31, 1967 J. E. TURNEY 3,301,405
STORING GLASS SHEETS
Filed April 15, 1965 3 Sheets-Sheet 3
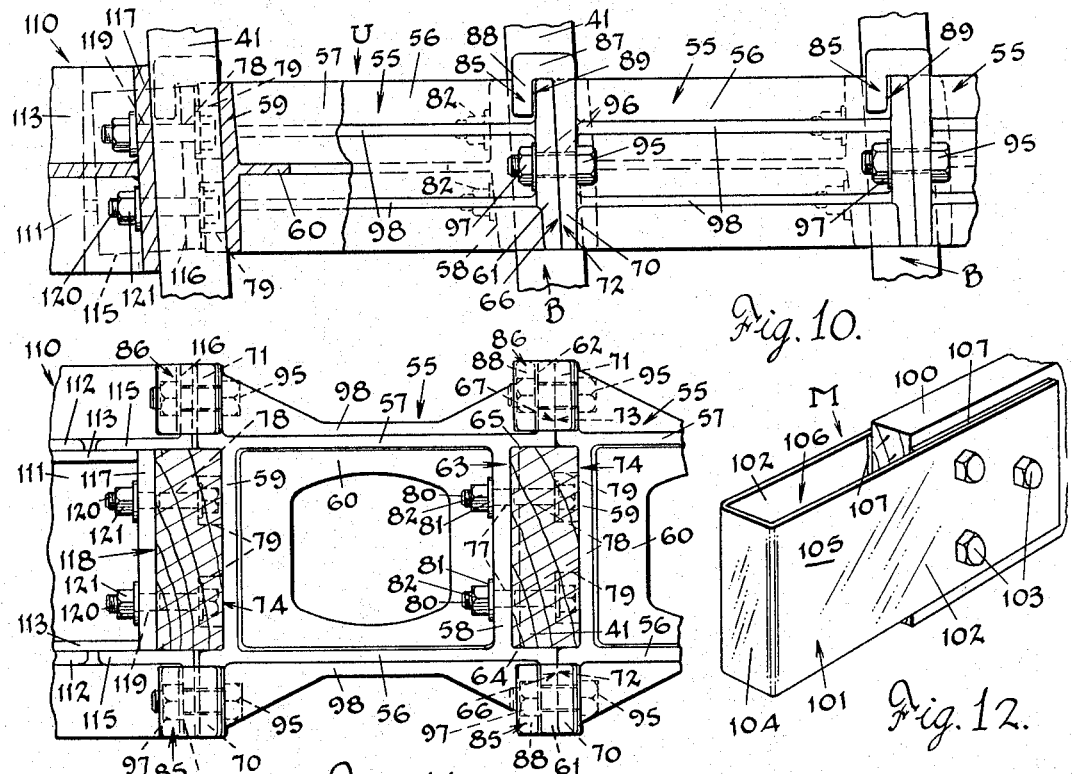
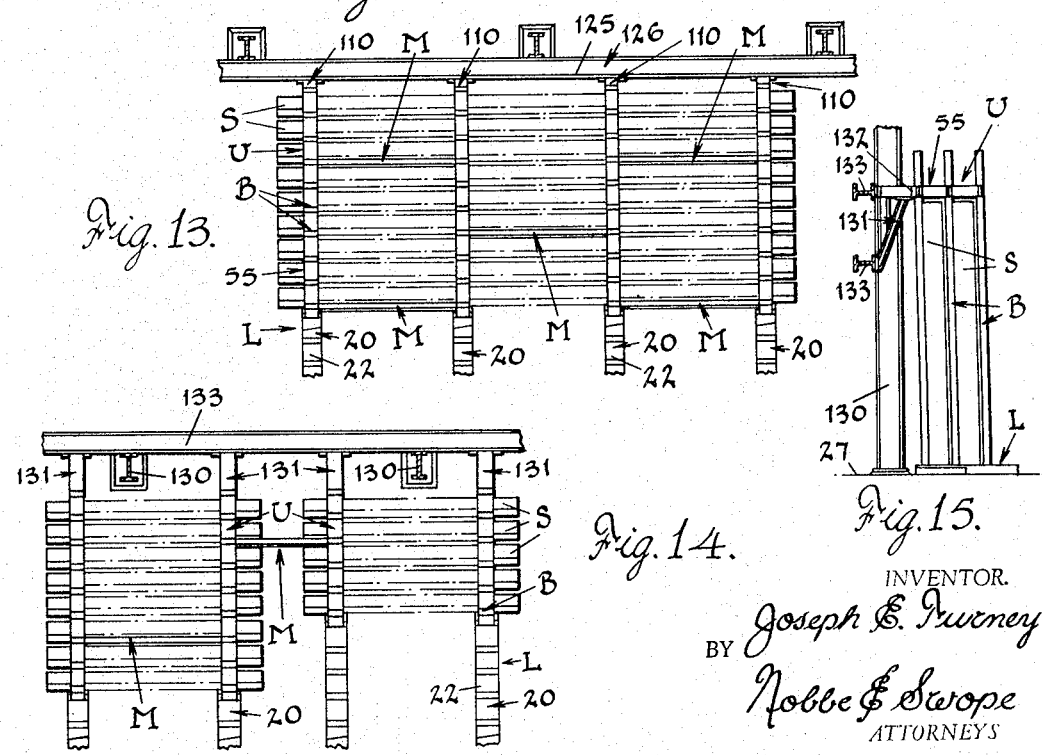
INVENTOR.
Joseph E. Turney
BY Nobbe & Swope
ATTORNEYS United States Patent Office 3,301,405
Patented Jan. 31, 1967

3,301,405
STORING GLASS SHEETS
Joseph E. Turney, Toledo, Ohio, assignor to Libbey-Owens-Ford Glass Company, Toledo, Ohio, a corporation of Ohio
Filed Apr. 15, 1965, Ser. No. 448,512
13 Claims. (Cl. 211—41)

The present invention relates broadly to the storage of rigid sheets, plates or the like and more particularly to an improved apparatus for storing relatively large sheets or plates of glass.

An important object of this invention is to provide an improved apparatus for storing a plurality of glass sheets, plates or blanks, arranged in face to face relation, as a unit or stoce while supporting the same on edge and with like units or stoces stacked in fixed spaced relation to one another.

Another object is the provision of a storage apparatus wherein a plurality of units or stoces of vertically arranged glass sheets or plates are stacked on edge and each unit or stoce is individually supported in spaced relation with respect to another unit or stoce.

Another object is to provide storing apparatus which incluudes a plurality of horizontal base members constituting a fixed lower structure laid on the floor in parallel spaced relation for supporting the lower edges of the sheet materials to be stored; and substantially vertical spacing members adapted to maintain the sheet materials in substantially vertically stacked relation; each of said spacing members being engageable at its upper end with cooperating header blocks to maintain units or stoces of the stored sheets in spaced relation.

A further object is to provide apparatus of the above character which will retain a number of units or stoces of sheets or plates of glass in the desired position in a positive manner and which is of such construction that the units or stoces of sheets can be easily and rapidly located therein or removed therefrom.

Other objects and advantages of the invention will become more apparent during the course of the following description when read in connection with the accompanying drawings.

In the drawings, wherein like numerals are employed to designate like parts throughout the same:

FIG. 1 is a perspective view of a sheet storage and supporting apparatus constructed in accordance with this invention;

FIG. 2 is a perspective view of a cooperating header block;

FIG. 3 is a fragmentary side elevation of the apparatus of FIG. 1 with stacks of sheets stored therein;

FIG. 4 is a horizontal section taken on line 4—4 of FIG. 3, and illustrates one part of the lower sheet support structure;

FIG. 5 is a transverse vertical section taken on line 5—5 of FIG. 4;

FIG. 6 is a transverse vertical section taken on line 6—6 of FIG. 4;

FIG. 7 is a transverse vertical section taken on line 7—7 of FIG. 4;

FIG. 8 is a transverse vertical section taken on line 8—8 of FIG. 4;

FIG. 9 is an enlarged detail view of the lower sheet support structure;

FIG. 10 is an enlarged side elevation of the upper sheet support structure, portions thereof being shown in cross-section;

FIG. 11 is a plan view of a part of the structure of FIG. 10;

FIG. 12 is an enlarged fragmentary perspective view of a bracing member;

FIG. 13 is a diagrammatic plan view of one storing arrangement;

FIG. 14 is a diagrammatic plan view of a second storing arrangement; and

FIG. 15 is a fragmentary side elevation of the storing apparatus of FIG. 14.

In its broadest aspects, this invention contemplates the storing of sheets or plates stacked on edge in surface to surface contact and supported at a "back" angle of relatively small degree from a vertical plane. In this connection, the term "sheet" will hereinafter be employed in a generic sense to include a "blank" or sheet of glass having unfinished surfaces as well as finished or semi-finished sheets or plates of glass, or other materials.

With more particular reference to the drawings, the storing apparatus A of this invention, as will be seen in FIG. 1, includes a lower horizontal base structure, generally designated by the letter L, an upper horizontal support structure, similarly designated by the letter U and substantially vertically disposed spacing or weight-sustaining bars B located therebetween. The lower support structure L includes individual base members adapted to be arranged in spaced, parallel rows upon the floor of a storage area with the number of rows depending on the combined lengths of the sheets to be supported. The base members of the structure L can be varied in length to suit any numbers of sheets, combined into individual units or stoces, stacked in outwardly spaced relation from a structural wall or other framework of a storage building.

As herein employed, the term "stoce" will be understood to refer to an individual group or unit made up of a number of sheets. Such stoces may have already been formed and be transferred or delivered to the storage area as such. On the other hand, sheets can be individually stacked on edge one against another in the storage area until a predetermined number has been deposited to form a stoce. It is preferred that the total thickness of each unit or stoce of sheets will be less than the distance between adjoining vertical bars B rising from each base member of the lower support structure L whereby the leaning weight of the sheets will be sustained by the vertical bars.

Preparatory to storing a successive number of units or stoces of sheets, as viewed in FIG. 1, a first row C of longitudinally spaced bars B is formed by the attachment of the lower ends of longitudinally spaced bars B adjacent the inner ends of the several base members of the structure L and the securing of the upper ends of the bars to a horizontally disposed beam, for example of the building structure. This row C of spacing bars provide a first weight-sustaining surface against which the sheets can be safely stacked.

After locating a unit or stoce of sheets on the spaced members of structure L and against the bars B of the first row C, a second row of bars D is similarly arranged in position to receive a second unit or stoce of sheets. In other words, as the stoces of sheets S, indicated in broken lines in FIG. 1, are successively stacked on the structure L, the bars B are arranged in successively outwardly spaced relation from the first row C. As each row of bars B is formed, the upper ends thereof are rigidly connected one to another to form a horizontal upper support structure U that is parallel to the horizontal structure L therebeneath. And the upper ends of the bars B are further cross-connected, or "tied" together, by bracing members M which assist in securing the rows of bars B into an integral set of components that comprise the storing apparatus of the invention.

With more specific reference now to the formation of the lower support structure L, it will be seen from FIGS. 1, 3 and 4 that it includes a plurality of base members or lengths of wood 20, which may be 4 x 8's. Each base member 20 includes a primary section 21 and one or more aligned secondary sections 22 with the primary section 21 being provided along the side surfaces adjacent its rear end with angular floor plates 25 and at its rear end with an anchor plate 26. Each floor plate 25 is fixed to the building floor 27 by means of bolts 28 passing through the horizontal plate flange 29 and received in conventional concrete anchors 30. The same is true of the anchor plates 26 and the vertical plate flanges 31 of floor plates 25, and the wood primary section 21, are drilled to receive connecting bolts 32 equipped with nuts 33.

As seen in FIG. 1, the left-hand and adjacently disposed base members 20 of the support structure L each includes a primary section 21 and a secondary section 22, while the right hand structure is extended further by the provision of an additional secondary section. Of course, in constructing the base members for actual use the same number of secondary sections will ordinarily be employed for each. In adding secondary sections, the adjacent ends of sections 21-22 or 22-22 are secured together by metal plates 35; said ends being cross-drilled to receive pairs of bolts 36, equipped with nuts 37 (FIGS. 4 and 7). Also, as seen in FIGS. 1 and 4, the ends of the base member sections are preferably finished with diagonally disposed surfaces 38 and, when joining the sections it has been found that the angled abutting surfaces come into contact more readily. However, and more importantly, this type of joint will be disposed diagonally with reference to the lower edges of the supported sheets which prevents objectionable entry of the sheet edge.

The primary and secondary sections 21-22 of each base member 20 of the lower support structure L are provided in their upwardly directed surfaces with transverse notches 40 for receiving the lower ends of the substantially vertical weight-sustaining bars B which may be in the form of a wood rail, or 2" x 6", 41. The distances between the notches 40 should position and maintain the bars B a distance apart that is greater than the average total thickness of a unit or stoce of sheets. In this connection, it will be noted that the diagonal surface 38 at the end of primary section 21 and the similar surface 38 of the adjoining secondary section 22 are so spaced from the endmost notches 40 of said sections that, when they are joined together, the distance between all notches will be equivalent.

The lower ends of bars B are held within the notches 40, and thus prevented from inadvertent upward escaping movement, by bolts 43 and pairs of links 44 and 45 arranged on each side of the base member or wood piece 20, constituted by the primary section 21 and one or more secondary sections 22. As viewed in FIGS. 4 and 6, bolts 43 pass through the aligned holes 46 in the floor plates 25 and hole 47 in section 21 to support the links 44 and 45 with a nut 48 serving to retain the link 44. This is also true with regard to the plates 35 arranged along the joined ends of the various sections 21-22 or 22-22. After the end of a bar has been received in a notch 40, a bolt 49 is inserted through a link 44, a hole 50 provided in the bar end and the link 45 after which a wing-nut 51 or the like is threaded onto the bolt. This action is of course carried out along each longitudinally disposed row of bars after a unit or stoce of sheets has been stacked against a preceding row of bars.

To prevent the links from inconveniently swinging downwardly until their free ends rest upon the floor, pins or pegs 52 are provided, as in FIG. 9, to engage the links in positions at which they can be readily grasped and moved to the operative position as shown in full line.

The upper support structure is essentially formed by rigid end to end association of spacer blocks or headers 55 that are adapted to be secured adjacent the upper ends of the rails 41 of bars B at a predetermined location to position the headers above or in upwardly spaced relation from the top edges of the sheets. This is of course easily computed by the "short" dimension of the sheets as they are stacked on edge in a substantially vertical plane. A preferred form of header block is illustrated in FIG. 2.

This spacer or header block, designated 55, is preferably an aluminum or other lightweight alloy casting and is formed with parallel, vertically disposed side walls 56-57, opposed end walls 58-59 and a reinforcing rib 60 located medially between their upper and lower surfaces and integrally joining the inwardly directed surfaces of the various walls (FIG. 2). The wall 58 is spaced inwardly from the adjoining ends of side walls 56-57 which there terminate in outwardly directed flanges 61 and 62. This provides an upwardly directed channel 63 which is defined by the wall 58, end wall extensions 64 and 65 of the side walls and the aligned outer surfaces 66 and 67 of the flanges 61 and 62. While the side walls have heretofore been described broadly as being substantially vertical, at least the outer surface of the end wall 58 and the surfaces 66 and 67 of flanges 61 and 62 are finished to an angle substantially parallel to the desired "back" angle to a vertical plane in which a unit or stoce of sheets are stacked against the wood rail 41 of a weight-sustaining bar B. By way of example, such an angle may be in the order of 2° to the vertical.

The opposite ends of side walls 56 and 57 of the block 55 similarly terminate in outwardly directed flanges 70 and 71 having aligned outer surfaces 72 and 73 substantially parallel in plane to the planes of surfaces 66 and 67 of flanges 61 and 62. The outer surface of end wall 59 is disposed inwardly of the surfaces 72 and 73 to provide a relatively shallow channel 74.

As shown in FIGS. 10 and 11, a header block 55 is secured to a related rail 41, which is received within its channel 63 and contacts its end wall 58 which is provided with bolt holes 77 arranged in pairs above and beneath the adjoining portion of the rib 60. Preparatory to assembly, the rail 41 has been provided with bolt holes 78 terminating in counterbored recesses 79 so that, with a rail positioned in the channel 63 of a header block, bolts 80 are passed through the aligned holes 77 and 78 with the heads thereof being received in the recesses 79. The bolts are then secured by means of washers 81 of a fiber material and nuts 82 when the same are turned tightly against the inner surface of wall 58. The use of fiber washers 81 precludes the possibility of undesired reaction between the aluminum cast header block when bolts of other metals are employed and the apparatus is to be located in an area of varying climatic conditions.

During a storing operation the successively placed spacing bars B can be positioned in a rapid and simple manner because each header block 55 is provided with downwardly directed hooks 85 and 86; each formed with a horizontal web 87 and vertical finger or leg 88 to define, with the surfaces 72 and 73, aligned notches 89 and 90. As seen in FIG. 2, the inner corners of the legs 88 are provided with outwardly and downwardly sloping surfaces 91.

With further reference to FIGS. 10 and 11, in successively attaching the header blocks one to another, the hook 85 engages the upper corner of flange 61 to locate the said flange within the recess 89 as the surface 66 of the flange 61 comes in contact with the registering surface 72 of the flange 70 while hook 86 engages flange 62, in the same manner, with the surfaces 67-73 of flange 62-71, respectively, being placed in contact. During these actions, the sloping surfaces 91 engage adjoining portions of the side walls 56-57 to easily guide the hooks 85 and 86 as they are urged downwardly.

This manner of joining the header blocks also encloses the associated rail 41 within combined areas of channels 63-74 wherein it is more or less tightly clamped by means of bolts 95. These bolts are employed to maintain the header blocks in positive and rigid relation to one another. For this purpose, the flanges 61–62 and 70–71 of each header block 55 are provided with aligned bolt openings 96 through which bolts 95, equipped with nuts 97 are passed. To further reinforce the header blocks, pairs of integral ribs 98 are located along the outer surfaces of the side walls 56 and 57 between the related flanges 61–70 and 62–71.

One end of a cross-bracing member M is illustrated in FIG. 12 which structure is common to the opposite end. Thus, each member includes a wood bar or rail 100, which may be of 2" x 6" lumber, equipped with U-shaped straps 101 at each end. Each strap is attached at the inner ends of the sides 102 thereof to the respective end of the rail 100 by bolts 103. The side portions 102 of each strap are formed to provide with the web 104 a loop portion 105 defining an open area 106 to snugly receive the end of a rail 41 therein. Preferably, spacing plates 107 are employed between the bar 100 and the inner ends of the strap side portions 102 to space said side portions apart a distance slightly greater than the thickness of the bar or rail 100 to freely receive the rail 41, of substantially the same thickness, in the open area 106.

To prepare a warehouse or storage area for the use of the storing apparatus of this invention, the available floor space and structural framework of the building are of course of prime importance since the permanent or temporary mounting of the apparatus depends upon the fixed location of the lower supporting structures L with reference to a suitable means for attaching the component elements of the upper structure U including the joined header blocks 55 of the spacing bars B. One satisfactory way has been found in the use of a so-called "starter" header to which the rail 41 of a bar B in the first row C will be secured. As seen in FIGS. 3, 10 and 11, this type of header, designated by the numeral 110, includes a base member 111 of I beam construction having angle members 112 fixed to one end of the vertically disposed flanges 113 thereof. The surfaces of the outwardly directed legs 114 of the angles 112 are substantially vertical or at right angles to the horizontal plane of the base member. At the opposite end of the base member 111, similar angle members 115 are secured to the flanges 113 to locate the surfaces of the outwardly directed legs 116 at an angle, such as the angle of 2°, heretofore discussed in connection with the wall surfaces of the header block 55. The angles 115 are located in such spaced relation to the proximate end of the base member as to cooperate with an integral web plate 117 therebetween to form a channel 118 in which a rail 41 will be received. The plate 117 is located in a plane parallel to the plane of the legs 116 and is provided with bolt holes 119 that are located for alignment with the like holes 78 in the rail. Accordingly, by means of bolts 120 and nuts 121, the starter header 110 is firmly attached to a wood rail 41. The starter headers 110 are thus located on a rail 41 at a predetermined distance from the adjacent end thereof in the same position as the header blocks 55 are mounted on like rails 41 as previously described.

This arrangement is common with all spacing bars B in the first longitudinally located row designated at C in FIGS. 1 and 3. The lower end of a rail 41 is then stepped into the first notch 40 of a primary section 21 of the lower supporting structure L and secured therein by a bolt 49 passed through the aforementioned links 44 and 45 and the rail. The section 21 is not at this time secured to the floor 27 but is adapted to be more or less freely shifted until the starter header 110 is brought into engagement with and connected to the flange 125 of a structural beam 126.

The rail 41 is now bodily moved to locate its end surfaces parallel to a perpendicular plane and with its side surfaces substantially parallel to plane determined by the surface of the flange 125. These initial adjustments will ensure that the primary section 21 of the lower structure L and the extended secondary sections 22 thereof will be preferably located in a plane that is substantially normal, or at a right angle to the beam 126. In the exemplary arrangement of the storing apparatus, as in FIG. 13, this preparatory mounting of the starter headers is repeated four times with the desired spaced distances between the headers being established to accord with the length of the sheets to be stored thereon and to provide substantially equal distribution of the weight on the lower support structures, L. In each instance, the angle members 112 of the headers 110 are permanently secured, as by welding, to flange 125 of the structural beam 126.

With the primary or starter sections 21 of the structure L being properly located, the concrete anchors 30 are secured in the floor 27 and the bolts 28 ultimately threaded therein to more or less permanently mount the sections 21. These preliminary installations ensure that the first row C of spacing bars B will be located in a common plane and that the base members 20 of the lower supporting structure L will be located in parallel to planes substantially at right angles to the longitudinal plane of the beam 126. Additionally, this results in positive longitudinal alignment of the notches 40 in the several sections 21 and 22 to the end that succeeding longitudinally disposed rows of weight-sustaining and spacing bars B will be substantially parallel to the first row as well as one another.

According to usual practice, a unit or stoce of glass sheets is transferred into the vicinity of the storing apparatus by means of an overhead bridge crane and is then lowered until the sheets are supported at their lower edges on the upper surfaces of the wood base member 20 and permitted to firmly contact the several bars B in stacked relation thereagainst. The second row of spacing bars B is then assembled.

For this purpose, the lower end of a rail 41 is positioned above the next adjoining notch 40 as an operator locates the hooks 85 and 86 of the associated header block 55 to engage the outwardly directed legs 116 of the angles 112 associated with the starter header member 110. Upon lowering of the bar B, the said legs 116 will be received firmly in the recesses 89 and 90 while the lower end of the related rail 41 will be located in the respective notch 40. A bolt 49 is now passed through the hole 50, provided in the rail, and the links 44 and 45 and secured by a wing-nut 51; this being believed to be an easy expedient to a rapid, manually achieved manner of assembly. Similarly, the header 55 is rigidly joined to the starter header 110 by bolts 95 passed through aligned holes in flanges 70–71 and the angle legs 116 and secured by nuts 97. As the first row of spacing bars are properly arranged, the rails thereof are firmly held within the combined open area of the channel 118 of starter head 110 and the channel 74 of the first header block 55.

After stacking of a second unit or stoce of sheets, a third longitudinal row of spacing bars B is assembled in the above-described manner. In this connection, it will be recalled that the distances between the notches 40 in the members 20 of the lower supporting structure L are substantially identical to the distances between the outwardly directed surfaces 66–72 and 67–73 of the end flanges 61–70 and 62–71 of the header blocks 55 constituting the upper supporting structure U. Since, as previously noted, these upper and lower equal distances are greater than the total thickness of the sheets forming the unit or stoce of sheets, each unit or stoce will be stacked against its individual row of spacing and/or weight-sustaining bars, as in FIG. 3, and the rows of bars will be maintained at a predetermined distance from one another to establish a fixed distance between the successively stacked units or stoces. Consequently, the weight of each unit or stoce will be individually sustained by the storing apparatus and without creating objectionable imposition of weight by one unit or stoce resting or being supported by an adjacent unit of glass sheets. It is believed to be of prime importance that the weight of each unit or stoce of sheets be sustained by rigid connection of the joined header blocks which results in the accumulative weight being carried by the structural framework of the building.

With reference again to FIGS. 1 and 3, when a desired number of units or stoces have been stored in outwardly spaced relation, the next succeeding row of spacing bars are interconnected in alternately spaced pairs by the cross-braces M. This is also seen in plan in FIG. 13 wherein it will be noted that the first and second transverse rows of bars and the third and fourth transverse rows are interconnected longitudinally therebetween by aligned cross-braces M. Likewise, after the storing of a successive, selected number of units or stoces, a cross-brace M is employed to interconnect the second and third transverse rows of bars. In each instance, the end loops 105 are lowered to receive the upper ends of the selected bars B and the rail 100 permitted to rest on the web portions 87 of the hooks associated with the header blocks therebeneath. A subsequent interconnection of the first and second rows and the third and fourth rows is also indicated in FIG. 13. Obviously, this cross-bracing can be carried out repeatedly according to the number of units or stoces of sheets to be arranged in stored relation with the apparatus A. The cross-braces M serve to "tie" the several transverse rows of spacing bars B together thereby reducing if not eliminating any possibility for the upper ends of the bars, or the upper supporting structure U, to shift out of parallel or from the vertical position above the related lower supporting structures L.

In consideration of FIG. 14, it will be appreciated that utility of the storing apparatus is not necessarily restricted to the storing of relatively long glass sheets or blanks having unfinished or semi finished surfaces and which are customarily processed in one way or another before being cut into sheets or plates of selected smaller dimensions. Nor for that matter to the manner of storing disclosed in FIG. 14 which by way of example illustrates a situation in which two rows of relatively short sheets are stored in substantially the same manner as that heretofore set forth but with the spacing between support structures being varied to suit certain combinations of storage. Another feature of the invention is however disclosed in connection with this figure to provide the suitable storing of sheet materials in areas where starter headers 110 cannot conveniently be employed. This may be due to physical obstructions which prevent entry of a crane to deliver a first unit of sheets into the area of the first row of bars B, although it is realized that several longitudinal rows of spacing bars can be assembled before a first unit or stoce of sheets is to be stacked thereagainst. Thus, where vertical support columns, as at 130, for supporting the horizontally disposed beams 126 are located on the reverse side thereof, according to a selected storing area or for other reasons, a mounting bracket or fixture is adapted to be alternatively employed in place of the usual starter headers 110. One such type of fixture, as is indicated at 131, is equipped at its outwardly directed end with angularly disposed angle members 132 on which the first header block 55 can be mounted and secured. The fixture can be secured, as in FIG. 15, to available structure members, such as horizontally disposed beams 133, as by welding.

While the novel features of this invention are believed to be fully covered in the foregoing description, it is also to be noted that as units or stoces of sheets are successively removed from their stored positions afforded by the storing apparatus, the progressive disassembly of the spacing bars B one from another at their upper ends and from the sections 21–22 of the lower structure L permits the storage area to be eventually cleared. In fact, unless the storing of sheet materials is repeatedly practiced in one area, upon dismantling of the first row of bars from the starter headers 110, the apparatus in its entirety or component portions thereof can be immediately put to use in adjoining areas.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:
1. Apparatus for storing sheet material comprising,
   (a) a lower supporting structure, including a plurality of spaced substantially parallel base members,
   (b) each of said base members being made up of a plurality of elongated elements having matching ends abutting along a line at an angle to their width,
   (c) means for securing said elements in said abutting relationship,
   (d) a plurality of weight-sustaining members extending upwardly from said base members, and
   (e) an upper supporting structure, including a plurality of members associated with said weight-sustaining members adjacent their upper ends and spacing the same from and connecting them to one another.
2. Apparatus for storing sheet material comprising,
   (a) a lower supporting structure, including a plurality of spaced substantially parallel base members,
   (b) a plurality of weight-sustaining members extending upwardly from said base members,
   (c) said base members being notched transversely to receive the lower ends of said weight-sustaining members,
   (d) means on said base members for securing said weight-sustaining members thereto, and
   (e) an upper supporting structure, including a plurality of members associated with said weight-sustaining members adjacent their upper ends and spacing the same from and connecting them to one another.
3. Apparatus for storing sheet material comprising,
   (a) a lower supporting structure, including a plurality of spaced substantially parallel base members,
   (b) a plurality of weight-sustaining members extending upwardly from said base mmebers, and
   (c) an upper supporting structure, including a plurality of members associated with said weight-sustaining members adjacent their upper ends and spacing the same from and connecting them to one another,
   (d) said base members in said lower supporting structure and spacing and connecting members in said upper supporting structure being notched to receive said weight-sustaining members.
4. Apparatus for storing sheet material comprising,
   (a) a lower supporting structure, including a plurality of spaced substantially parallel base members,
   (b) a plurality of weight-sustaining members extending upwardly from said base members,
   (c) an upper supporting structure, including a plurality of members associated with said weight-sustaining members and spacing the same from and connecting them to one another,
   (d) certain of said spacing and connecting members in said upper supporting structure including header blocks arranged in end-to-end relationship above and parallel to the base members in said lower supporting structure, and
   (e) means for securing adjoining header blocks together with one of said weight-sustaining members therebetween.
5. Apparatus as defined in claim 4 in which said securing means includes interengageable flange members, and said header blocks are recessed to receive said weight-sustaining members.
6. Apparatus for storing sheet material comprising,
   (a) a lower floor mounted structure, including a plu- rality of base members arranged in equally spaced parallel relation to one another and having transversely disposed notches in the upper surface thereof;

(b) substantially vertically disposed weight-sustaining members carried on said base members with the lower ends thereof received in said notches;

(c) a spacer block positioned adjacent the upper end of each of said weight-sustaining members, (d) means for interconnecting the spacer blocks on adjacent weight-sustaining members to locate the upper ends of said weight-sustaining members in parallel rows parallel with said base members;

(e) structural framework disposed in a plane parallel to the longitudinal plane along a first dimension of the sheet material to be stored;

(f) means supporting at least one of said weight-sustaining members in outwardly spaced relation to said structural framework.

7. Apparatus for storing a plurality of units of sheet material as claimed in claim 6 in which (a) each base section comprises a starter section and aligned secondary sections, (b) the notches provided in each of the starter and secondary base sections being spaced therealong an equal distance greater than the total thickness of a unit of sheet material, (c) the first notch of the starter section of each base section receiving the lower end of a first weight-sustaining member, the upper end of said first weight-sustaining being secured to a support means associated with said structural framework to locate the said spaced notches of said base sections in aligned planes parallel to said longitudinal plane, (d) means rigidly joining the starter sections and secondary sections of each base member one to another in aligned relation, (e) means releasably securing the lower end of a weight-sustaining member in a notch after the same has been located therein.

8. Apparatus for storing a plurality of units of sheet material as claimed in claim 7, in which (a) each starter section of said base members are secured to the floor of the storing area after the weight-sustaining member in the first notch therein has been disposed in a rearwardly disposed angular plane to a perpendicular plane, (b) the lower end of each weight-sustaining member is provided with a transverse bolt-receiving hole, (c) a link carried along each side of the base members and arranged in pairs adjacent each of the notches therein, (d) means supporting the lower ends of each of the pairs of links on the respective base members, (e) fastening means passing through the bolt-receiving hole of a weight-sustaining member and the upper ends of said pair of links to releasably retain the lower end of said member within a related notch.

9. Apparatus for storing a plurality of units of sheet material as claimed in claim 6, in which (a) the spacer block associated with each weight-sustaining member includes longitudinally disposed side walls and transverse end walls, (b) the upper and lower surfaces of said side and end walls being located in parallel planes with respect to one another, (c) the outer surfaces of the end walls being located in parallelism and inclined at an angular plane to the parallel planes of the said upper and lower surfaces, (d) the spacer block having outwardly directed flanges at the respective corners thereof, the surfaces of said flanges being disposed in outwardly spaced relation from the surfaces of the related end walls and in planes parallel thereto, (e) the upper ends of the transversely disposed flanges at one end of the block being formed with downwardly directed hook portions.

10. Apparatus for storing a plurality of units of sheet material as claimed in claim 9, in which (a) one end wall of said spacer block is provided with a plurality of bolt-receiving holes, (b) the associated weight-sustaining member having a corresponding plurality of bolt-receiving holes adapted to be aligned with like bolt-receiving holes in said end wall, (c) fastening means in the aligned holes of the spacer block and weight-sustaining member to rigidly secure said member against said one wall of said spacer block to locate said hook portions in outwardly spaced relation from said weight-sustaining member, (d) the bolt-receiving holes in said weight-sustaining member being located in spaced relation from the lower end thereof to mount the spacer block substantially above the shorter dimension of a unit of the sheet material when the same is stored on each base member of the said lower structure.

11. Apparatus for storing a plurality of units of sheet material as claimed in claim 9, in which (a) the outwardly directed flanges at transversely disposed corners at one end of the spacer block are spaced from the adjacent end wall of said block to form a channel for receiving a weight-sustaining member therein, (b) the outwardly directed flanges at the respective transversely disposed corners having aligned bolt-receiving holes medially located between the upper and lower surfaces of said block, (c) said bolt-receiving holes in flanges at one end of a first spacer block being aligned with the block-receiving holes in the opposed flanges of a second spacer block when the hook portions of said second spacer block are passed downwardly over the flanges of said first spacer block, (d) the outwardly directed surfaces of the flanges at the respective transversely disposed corners of the spacer block being spaced a distance greater than the total thickness of a unit of sheet material to locate a second weight-sustaining member in spaced relation to said unit when the same is stored on edge in stacked relation against a first weight-sustaining member.

12. Apparatus for storing a plurality of units of sheet material as claimed in claim 6, in which (a) the interconnecting means is a bracing member comprised of a wood rail and U-shaped straps at each end of the rail, (b) said U-shaped strap being formed with outwardly directed looped portions adapted to receive the upper end of a weight-sustaining member therein to longitudinally join a selected weight-sustaining member associated with one base member with a longitudinally aligned weight-sustaining member associated with an adjacent base member.

13. Apparatus for storing a plurality of units of sheet material as claimed in claim 12, in which (a) certain of the bracing members interconnect selected weight-sustaining members in alternately disposed rows of base members, (b) others of the bracing members interconnect selected sustaining members in adjacent rows of said alternate rows of base members to tie the plurality of weight-sustaining members together in longitudinally aligned planes thereby rigidly forming said upper structure across the upper ends of the units of sheet material when the same are stored on edge in stacked relation against longitudinally disposed equally spaced rows of weight-sustaining members.

(References on following page)

References Cited by the Examiner

UNITED STATES PATENTS

| | | | |
|---|---|---|---|
| 1,889,350 | 11/1932 | Cohen-Venezian | 211—13 |
| 2,839,198 | 6/1958 | Lefevre | 211—41 |
| 2,940,402 | 6/1960 | Hansen et al. | 105—367 |
| 2,958,425 | 11/1960 | Best | 211—44 |
| 2,978,270 | 4/1961 | Verheggen | 294—67 |
| 3,042,978 | 7/1962 | Eames et al. | 52—32 |

CHANCELLOR E. HARRIS, *Acting Primary Examiner.*

CLAUDE A. LE ROY, *Examiner.*

W. D. LOULAN, *Assistant Examiner.*